United States Patent
Burrey

(10) Patent No.: US 7,156,983 B2
(45) Date of Patent: Jan. 2, 2007

(54) SWIMMING POOL BACKWASH ASSEMBLY

(76) Inventor: John G. Burrey, 23260 N. 87th Ave., Peoria, AZ (US) 85383

( * ) Notice: Subject to any disclaimer, the term of this patent is extended or adjusted under 35 U.S.C. 154(b) by 443 days.

(21) Appl. No.: 10/645,701

(22) Filed: Aug. 22, 2003

(65) Prior Publication Data

US 2004/0034916 A1    Feb. 26, 2004

Related U.S. Application Data

(60) Provisional application No. 60/405,313, filed on Aug. 23, 2002.

(51) Int. Cl.
    *E04H 4/00* (2006.01)
    *B01D 35/157* (2006.01)
(52) U.S. Cl. ............... 210/108; 210/138; 210/169; 210/258; 210/416.2; 417/12
(58) Field of Classification Search .......... 417/12; 210/108, 138, 169, 416.2, 425, 258
    See application file for complete search history.

(56) References Cited

U.S. PATENT DOCUMENTS

| | | |
|---|---|---|
| 3,365,064 A | 1/1968 | Horan, Jr. |
| 3,963,375 A | 6/1976 | Curtis |
| 4,310,144 A | 1/1982 | Nogaki |
| 4,482,461 A | 11/1984 | Hindman et al. |
| 4,505,643 A | 3/1985 | Millis et al. |
| 4,676,914 A | 6/1987 | Millis et al. |
| 4,869,817 A | 9/1989 | Mendoza et al. |
| 4,917,795 A | 4/1990 | Sable et al. |
| 5,584,992 A | 12/1996 | Sugimoto |
| 5,730,861 A | 3/1998 | Sterghos et al. |
| 5,895,565 A | 4/1999 | Steininger et al. |

*Primary Examiner*—Terry K. Cecil
(74) *Attorney, Agent, or Firm*—Richard C. Litman

(57) ABSTRACT

A swimming pool backwash control arrangement includes a timing device incorporated with a valve for controlling normal re-circulating flow and backwash flow through a swimming pool filter. The timer is constructed to be in series with the electric power circuit to the pool pump and is activated when the valve is moved to the backwash flow position. The timer functions to maintain electric power to the pump for a user-specified or a pre-set period. At the end of the period the timer will cause the circuit to open thereby disabling the pump. Power can be restored to the pump by returning the valve to its normal re-circulating flow position.

3 Claims, 2 Drawing Sheets

SWIMMING POOL BACKWASH ASSEMBLY

CROSS-REFERENCE TO RELATED APPLICATION

This application claims the benefit of U.S. Provisional Patent Application Ser. No. 60/405,313, filed Aug. 23, 2002.

BACKGROUND OF THE INVENTION

1. Field of the Invention

The present invention generally relates to swimming pool control systems. More specifically, the present invention is drawn to a system for preventing a swimming pool from accidentally emptying when the backwash valve is set in the backwash position.

2. Description of Related Art

Swimming pools provide exercise and entertainment for young and old alike. It is especially enjoyable when the swimming pool is in your backyard for use by family and friends. Unfortunately, swimming pools require some maintenance.

Part of the maintenance involves cleaning the pool filter. On many pools, a valve is employed to change the normal pool water circulation through the pump and direct the water from the pool through the filter in a reverse direction in order to wash the dirt and lint from the filter. This backwash water flows out of the system into a drain or the like. If the valve is not reset in a reasonable time (dependent on pool size, filter size, etc.) the pool will be drained to an extent requiring large amounts of expensive refill water. In extreme situations, the pool may be emptied completely and the pool pump damaged.

An inexpensive, easy to install system to prevent the above scenarios would certainly be a welcome addition to the art.

The related art is rife with complex systems for controlling water circulation in swimming pools and the like. Examples of such systems are disclosed in U.S. Pat. No. 4,310,144 (Nogaki), U.S. Pat. No. 4,482,461 (Hindman et al.), U.S. Pat. No. 4,505,643 (Millis et al.), U.S. Pat. No. 4,676,914 (Mills et al.), U.S. Pat. No. 5,584,992 (Sugimoto), U.S. Pat. No. 5,730,861 (Sterghos et al.) and U.S. Pat. No. 5,895,565 (Steininger et al.). As indicated above, all of the instant systems are complex and relatively costly to maintain. Further, none of the systems could be easily retrofitted or incorporated into the ordinary backyard pool without a great amount of expense.

U.S. Pat. No. 4,917,795 (Sable et al.) shows an automatic valve assembly used for pressure relief in swimming pool tanks. The valve does not function to control operation of the pool pump.

U.S. Pat. No. 4,869,817 (Mendoza et al.) is drawn to a valve lever control system for a swimming pool filter. The patentees do not contemplate provision of a timer to control pump operation.

U.S. Pat. No. 3,963,375 (Curtis) discloses a shut-down circuit for a re-circulation pump. The circuit is responsive to the discharge pressure of the pump.

U.S. Pat. No. 3,365,064 (Horan, Jr.) discloses a swimming pool backwash assembly but makes no provision to control the timing cycle of the backwash process.

None of the above inventions and patents, taken either singly or in combination, is seen to disclose a timer system associated with a backwash valve as will subsequently be described and claimed in instant invention.

SUMMARY OF THE INVENTION

The present invention is drawn to a timing device incorporated with a valve for controlling normal re-circulating flow and backwash flow through a swimming pool filter. The timer is constructed to be in series with the electric power circuit to the pool pump and is activated when the valve is moved to the backwash flow position. The timer functions to maintain electric power to the pump for a user-specified or a pre-set period. At the end of the period the timer will cause the circuit to open thereby disabling the pump. Power can be restored to the pump by returning the valve to its normal re-circulating flow position. As presently contemplated, the time period may be as little as eight seconds and as long as two hours. The usual time for a normal backwash procedure is about three minutes.

The above arrangement provides a safety factor for a user in that it prevents the pump from extracting excess water from the pool if the user forgets to move the valve from the backwash to the normal position after a period of time has elapsed.

Accordingly, it is a principal object of the invention to provide a safety feature to prevent a pool from being inadvertently emptied during a backwash cycle.

It is another object of the invention to provide a safety feature that allows a pool pump to be operational for a set period of time during a backwash cycle.

It is a further object of the invention to provide a safety feature to prevent pump burnout during a backwash cycle.

Still another object of the invention is to provide a safety feature that is easily retro-fitted to conventional pools.

It is an object of the invention to provide improved elements and arrangements thereof in an apparatus for the purposes described which are inexpensive, dependable and fully effective in accomplishing their intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
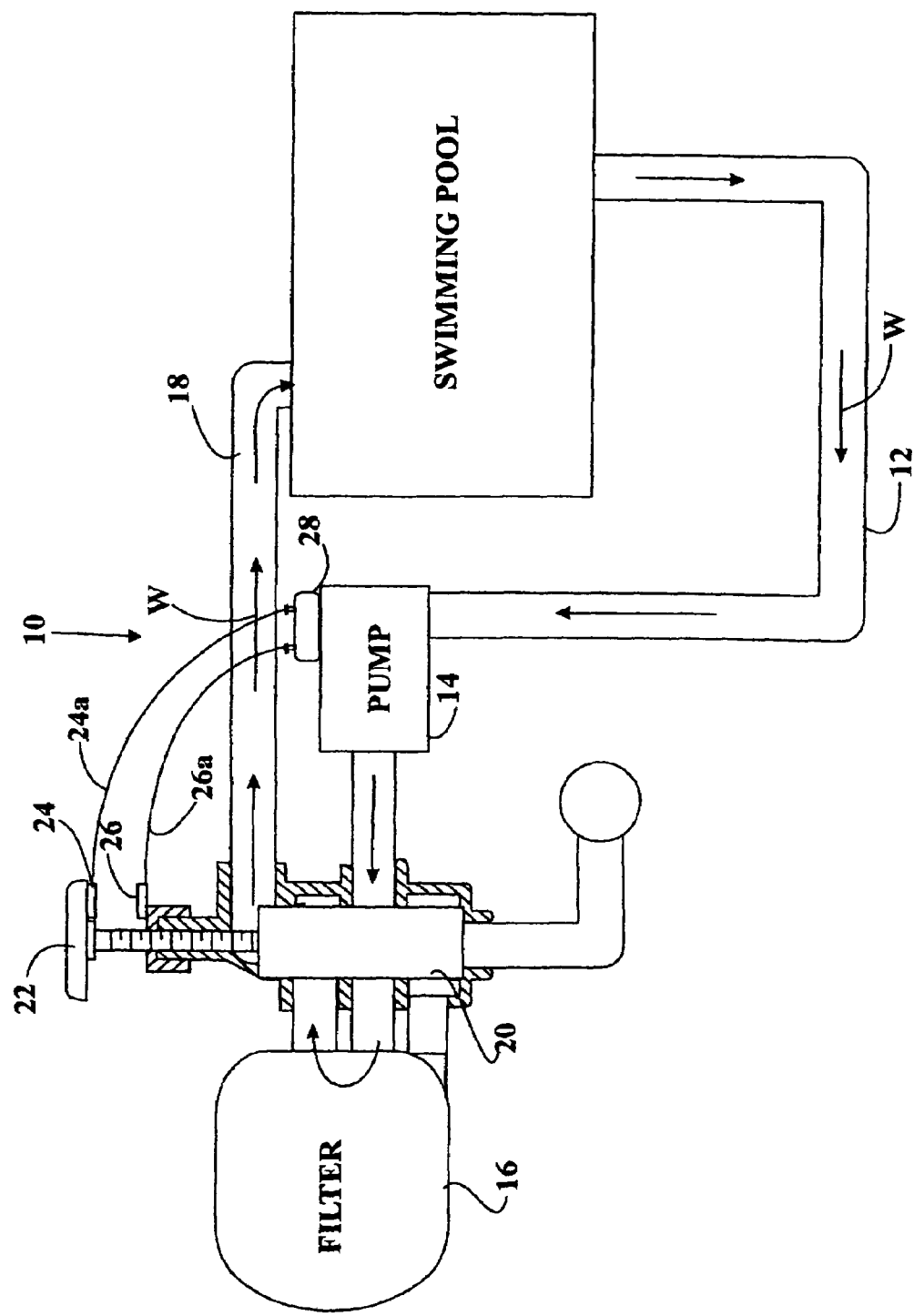
FIG. 1 is a schematic view of a swimming pool system incorporating the present invention in a normal re-circulating position.
Figure 2:
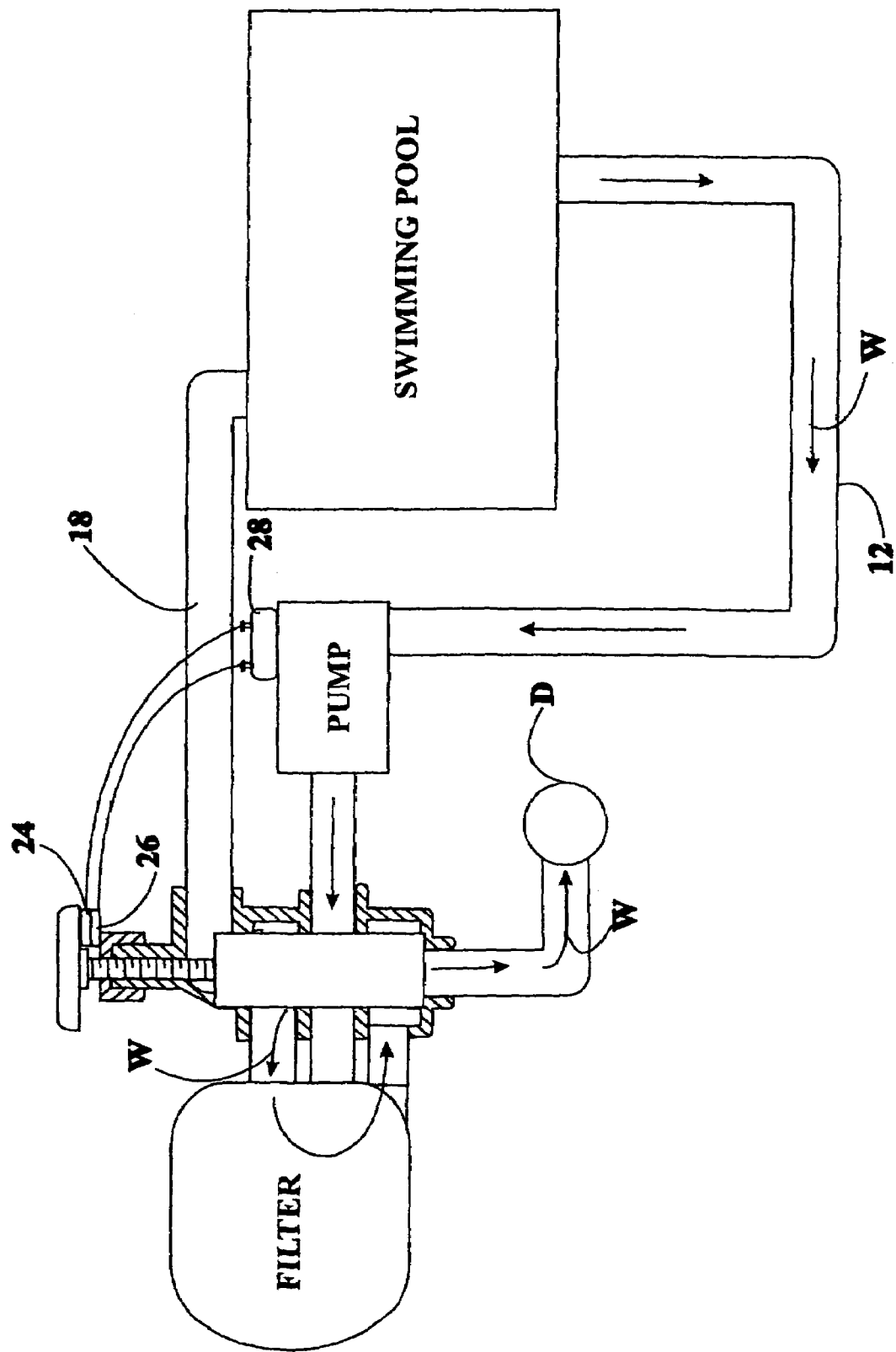
FIG. 2 is a schematic view of a swimming pool system incorporating the present invention in a backwash mode.

Attention is directed to FIGS. 1 and 2 wherein a system utilizing the present invention is generally indicated at 10. In FIG. 1 the swimming pool system is illustrated as operational in its normal re-circulating mode wherein the pool water W flows from the pool through a first conduit 12, pool pump 14, filter 16, and back to the pool through conduit 18. To accommodate the re-circulating flow, conventional valve 20 and valve handle 22 are in a normal up position. A pair of electrical contacts 24 and 26 is respectively positioned on the underside of the valve handle and on the valve body. Contacts 24, 26 are electrically connected via current carrying wires 24a, 26a to a timer 28. Timer 28 is connected in series with the electrical power source (not shown) for pump 14. When activated timer 28 functions to open a switch (not shown) after a timed period (pre-set or user-determined) to shut down pump 14. The timer 28 is conventional and may be chosen from the many commercial timers available in the marketplace.

When a user desires to backwash the filter, handle 22 is moved downward (FIG. 2) so as to adjust valve 20 to direct water flow W to clean the filter and flow to drain D. Downward movement of handle 22 will cause contacts 24, 26 to close, thereby activating timer 28 for a timed period. After the timed period, timer 28 functions to shut off power to pump 14, thereby deactivating the pump. The pump may be reactivated by merely moving valve handle 22 to its normal up position.

It is to be understood that the present invention is not limited to the sole embodiment described above, but encompasses any and all embodiments within the scope of the following claims.

I claim:

1. A system for controlling fluid re-circulation to and from a fluid reservoir, said system comprising:
   a fluid reservoir;
   a fluid re-circulation conduit connected to said reservoir for directing fluid to and from said reservoir;
   a pump disposed in said conduit for pumping fluid through said re-circulation conduit;
   a fluid filter disposed in said re-circulation conduit at a position downstream of said pump;
   a drain conduit disposed in said re-circulation conduit, said drain conduit positioned adjacent said filter;
   a valve disposed in said re-circulation conduit, said valve having a body portion and including structure to divert the fluid from said re-circulation conduit to said drain conduit;
   a handle attached to said valve for manually moving said valve from a position wherein said fluid is re-circulated through said system to a position wherein said fluid is diverted to said drain conduit;
   an electrical timer for controlling operation of said pump; and
   a pair of electrical contacts for actuating said electrical timer, wherein one of said pair of electrical contacts is attached to said handle and one of said pair of electrical contacts is attached to said valve body.

2. A system for controlling fluid re-circulation to and from a fluid reservoir as recited in claim 1, wherein said drain conduit is positioned upstream of said filter.

3. A system for controlling fluid re-circulation to and from a fluid reservoir as recited in claim 1, wherein said fluid reservoir is a swimming pool.

* * * * *